United States Patent [19]

Bordwell et al.

[11] Patent Number: 5,603,424

[45] Date of Patent: Feb. 18, 1997

[54] WALL MOUNTING ASSEMBLY ATTACHABLE TO AN ELECTRICAL BOX

[75] Inventors: Mark A. Bordwell, Memphis, Tenn.; Oliver Sims, Garland, Tex.

[73] Assignee: Thomas & Betts Corporation, Memphis, Tenn.

[21] Appl. No.: 509,907

[22] Filed: Aug. 1, 1995

[51] Int. Cl.⁶ ............................................. H02G 3/12
[52] U.S. Cl. .......................................... 220/3.5; 220/3.7
[58] Field of Search ................................ 220/3.6, 3.5, 3.4, 220/3.3, 3.2, 3.9, 3.7

[56] References Cited

U.S. PATENT DOCUMENTS

| | | | |
|---|---|---|---|
| 1,265,744 | 5/1918 | Canfield | 220/3.6 |
| 1,775,665 | 9/1930 | Behm . | |
| 1,957,003 | 5/1934 | Selen | 247/21 |
| 1,957,844 | 5/1934 | Olsen et al. | 247/21 |
| 2,233,731 | 3/1941 | Budnick | 220/3.6 |
| 2,272,846 | 2/1942 | Lindstrom | 220/3.6 |
| 2,299,696 | 10/1942 | Gregersen | 220/3.6 |
| 2,320,400 | 6/1943 | Bedell | 220/3.6 |
| 2,340,823 | 2/1944 | Scott | 220/3.6 |
| 2,374,993 | 5/1945 | Haynes | 220/3.3 |
| 2,430,067 | 11/1947 | Loy | 220/3.6 |
| 2,491,742 | 12/1949 | Lein | 248/205 |
| 2,736,450 | 2/1956 | Atkinson | 220/3.6 |
| 2,769,562 | 11/1956 | Rudolph | 220/3.4 |
| 2,776,774 | 1/1957 | Valelunga | 220/3.6 |
| 2,793,782 | 5/1957 | Austin | 220/18 |
| 2,801,019 | 7/1957 | DeRonck | 220/3.6 |
| 2,867,344 | 1/1959 | Nickell . | |
| 2,870,931 | 1/1959 | Buckels | 220/3.6 |
| 2,875,914 | 3/1959 | Buckels | 220/3.6 |
| 2,908,416 | 10/1959 | Rudolph | 220/3.6 |
| 2,955,891 | 10/1960 | McDonnold | 312/242 |
| 2,957,598 | 10/1960 | Menkee | 220/3.6 |
| 2,970,713 | 2/1961 | Kellberg | 220/3.6 |
| 3,448,952 | 6/1969 | Swanquist et al. | 248/27 |
| 3,614,144 | 10/1971 | Hodges | 287/189.35 |
| 4,120,416 | 10/1978 | Suk | 220/3.4 |
| 4,120,473 | 10/1978 | Suk | 248/205 |
| 4,332,330 | 6/1982 | Lockwood | 220/3.5 |

FOREIGN PATENT DOCUMENTS 4128042  2/1993  Germany .

*Primary Examiner*—Stephen J. Castellano
*Attorney, Agent, or Firm*—Michael L. Hoelter; Salvatore J. Abbruzzese

[57] ABSTRACT

A mounting assembly is attachable to a pre-manufactured electrical box. The box which includes a pair of opposed side walls, is insertable into an opening cut into a mounting wall. A pair of clip-on securement members are mountable onto each of the opposed side walls. Each securement member includes a bracket positioned on an external surface of the side wall and a brace supported by the bracket. The brace is movable on the bracket so as to clamp the box to the mounting wall.

20 Claims, 3 Drawing Sheets

WALL MOUNTING ASSEMBLY ATTACHABLE TO AN ELECTRICAL BOX

FIELD OF THE INVENTION

The present invention relates generally to electrical boxes which are mounted in an opening in a wall. More particularly, the present invention relates to a wall mounting assembly which is attachable to the electrical box which permits the securement of the box to the wall about the opening.

BACKGROUND OF THE INVENTION

The use of electrical junction boxes is well known in the art. In new construction, the boxes are typically mounted to wall studs prior to placement of the wall on the studs. Conventional fasteners may be used in these situations to mount the boxes to the wall studs. However in many instances where electrical boxes must be installed on existing walls, such as in remodeling, the wall studs are not always readily accessible or in the desired location to permit securement of the electrical box thereto.

In these situations, certain electrical boxes, referred to as "cut-in" or "old work" boxes, are used where the boxes are inserted into an opening cut into the wall. The boxes are specifically constructed to include clamping hardware which enables the box to be clamped to the wall itself about the opening without regard to the location of the wall studs. These cut-in or old work boxes must be specifically constructed to include wall mounting hardware permitting mounting of the box directly to the wall without use of wall studs.

These specifically constructed boxes generally take two forms. The first includes boxes having swing-out clips. Examples of boxes of this type are shown in U.S. Pat. Nos. 4,332,330, 2,299,696, 2,272,846 and 1,957,844. The boxes shown in these patents include adjustable clips mounted on each box side wall. The clips are initially positioned within the interior of the box so that the box may be inserted into an opening in the wall which is sized to specifically accommodate the box. After the box is passed through the opening, the clips may be swung outwardly through the side walls to engage the back surface of the wall. These swing-out clips, however, are difficult to manipulate in the tight environment in which these boxes must be installed. Further the box must include passageways or slots through the side wall of the box to enable the clip to swing out from an internal position to an external position once the box is inserted through the wall opening. As may be appreciated, boxes having swing-out clips of this type require extensive fabrication and/or modification of existing box structure. Due to such extensive modification, many of these types of cut-in boxes are not listed by agencies such as Underwriters Laboratories (UL) and Canadian Standards Association (CSA).

Another type of cut-in box includes those boxes which have clips and screws mounted on the exterior surface of the side walls or the top and bottom walls of the box. Examples of boxes of this type are shown in U.S. Pat. Nos. 2,867,344, 2,801,019, 1,957,003 and 1,775,665. As the clips shown in these patents are mounted exteriorly of the box, they present a wide profile which requires a larger hole to be cut through the wall into which the box is to be mounted. Such a large opening may require extensive repair after the box is installed or must be used with a large cover plate to cover the opening.

Also, many of these boxes include complicated wall engaging mounting structures. Compression devices, toggle clips, snaps and the like such as shown in U.S. Pat. Nos. 4,120,473, 4,120,416, 2,776,774, 2,870,931 and 2,769,562 may also be used to secure the box to the wall. However many of these structures are difficult for the installer to easily operate.

Common to all of the above described boxes, is the fact that the boxes must be prefabricated or specifically modified to accommodate particular mounting hardware. This necessitates the installer carrying boxes which are specifically manufactured solely for old work or cut-in applications in addition to boxes for other applications.

It is therefore desirable to provide a mounting assembly which allows for the use of a standard electrical box in old work or cut-in applications.

SUMMARY OF THE INVENTION

It is an object of the present invention to provide a mounting assembly which permits attachment of a standard electrical box about an opening cut in a wall.

It is a further object of the present invention to provide mounting assembly which is attachable to a standard electrical box which permits the box to be used in old work or cut-in applications.

It is a still further object of the present invention to provide a mounting assembly attachable to an electrical box which presents a thin profile upon insertion into a wall opening so as to minimize the width of the opening which must be cut through the wall to insert the box.

In the efficient attainment of these and other objects, the present invention provides a mounting assembly which is attachable to a pre-manufactured electrical box. The box includes opposed side walls, top and bottom walls, rear wall and an opposed open face. The box further includes a pair of mounting flanges extending outwardly from the top and bottom walls for engagement with one planar surface of a mounting wall about a wall opening into which the box is positionable. The mounting assembly comprises a pair of clip-on securement members. Each securement member is mountable onto one of the opposed side walls. Each securement member further includes an elongate bracket positioned on an external surface of the-side wall. The bracket extends between the rear wall of the box and the open front face of the box. The bracket includes attachment means for clamping the bracket to the side wall. A brace is supported by the bracket. The brace has a mounting wall engagement surface for engagement with a surface of the mounting wall opposite the one surface. An actuatable brace securement means movably secures the brace to the bracket. The brace securement means is actuatable to cause progressive movement of the brace from a first position spaced from the front face of the box to a second position adjacent the front face of the box to place the mounting wall engagement surface of the brace in engagement with the opposite surface of the mounting wall. The mounting wall is thereby clamped between the braces of each of the securement members and the mounting flanges of the box.

As particularly described by way of the preferred embodiment herein, the brace securement means may include an elongate screw captively attached to the bracket. The screw includes a head positioned adjacent the open face of the box and a threaded shaft extending along the bracket. The brace includes an aperture through which the threaded shaft of the screw extends to movably retain the brace on the bracket.

Screw actuation of the screw causes the progressive movement of the brace. The brace aperture may include a transverse aperture dimension which is substantially wider than the threaded shaft of the screw so that brace is further pivotally movable about the screw shaft from a third position where the mounting wall engagement surface is positioned against the external surface of the side wall of the box to a fourth position rotated approximately 90° from the third position wherein the mounting wall engagement surface of the brace is perpendicular to the side wall. In order to present a flat profile, the brace includes a central raised ridge defining an opposite recess which accommodates the screw shaft in the third position.

DETAILED DESCRIPTION OF THE PREFERRED EMBODIMENTS

Figure 1:
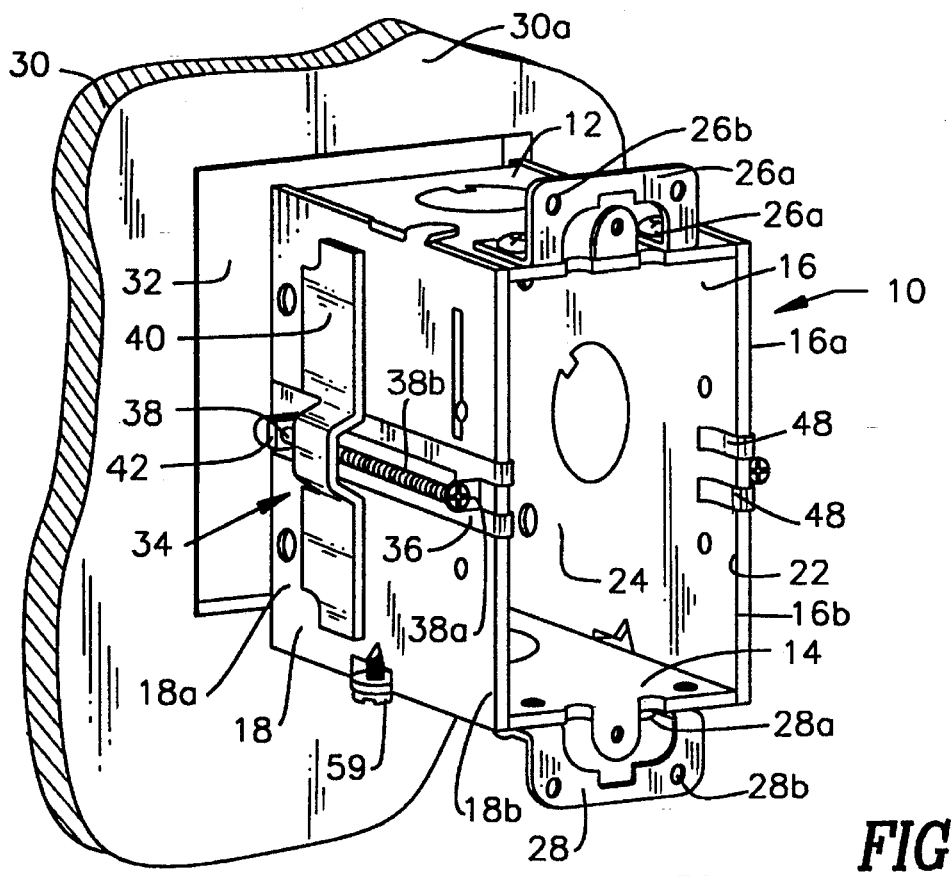
FIG. 1 is a front perspective view of an outlet box including the mounting assembly of the present invention shown adjacent a wall.
Figure 2:
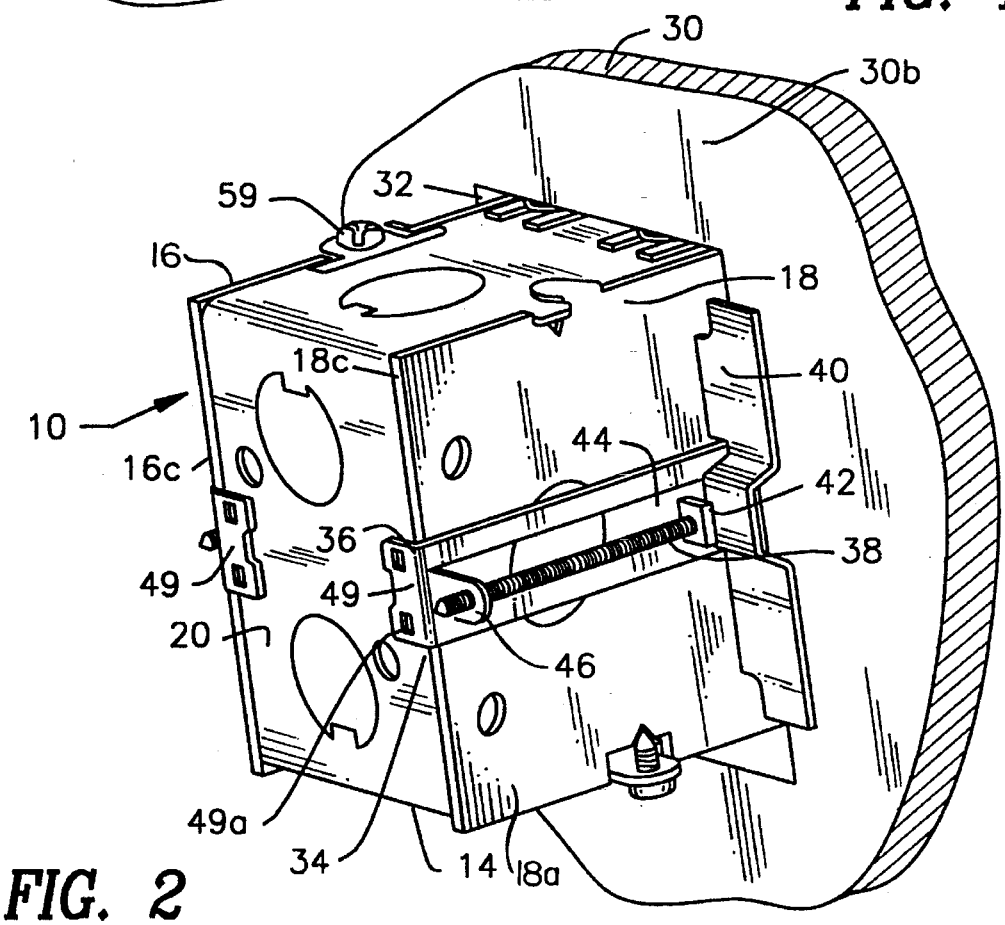
FIG. 2 is a rear perspective view of the assembly of FIG. 1 shown secured to the wall.

Referring to FIGS. 1 and 2, the present invention may be used in combination with a conventional electrical junction box 10 shown herein. Box 10 is a standard rectangular box used in the termination of electrical cables (not shown) to outlets, receptacles, switches and the like which are normally housed within the box. Box 10, shown by way of example herein, is a metallic member having a top wall 12 and opposed bottom wall 14 and spaced apart side walls 16 and 18 joining top and bottom walls 12 and 14. Box 10 further includes a slightly recessed back wall 20 and an opposed open front face 22 which permits access to the interior 24 of box 10. Box 10 further includes a pair of L-shaped flanges 26 and 28 extending outwardly respectively from top and bottom walls 12 and 14. Flanges 26 and 28 are adjustably secured adjacent the open front face 22 of box 10 by flange screws 26a and 28a.

Box 10 shown herein is capable of being mounted in conventional fashion to an exposed wall stud (not shown). The present invention, however, provides structure to enable box 10 to be mounted to a pre-existing wall 30 having an opening 32 placed therein for insertable accommodation of box 10. Conventionally, flanges 26 and 28 are used to secure box 10 directly to wall 30 with flanges 26 and 28 resting against an outer surface 30a thereof. Screws or other fasteners (not shown) may be inserted through openings 26b, 28b of flanges 26 and 28 and into wall 30. However as wall 30 is typically constructed of plaster, wallboard or the like, it is difficult to use flanges 26 and 28 alone to effect long term securement in such types of wall surfaces. The present invention provides the ability to mechanically clamp box 10 to wall 30 about opening 32 in a manner which securely retains the box therein and which allows the box to be inserted into an opening of minimal expanse.

Referring additionally to FIGS. 2–8, the present invention provides a pair of clip-on securement devices 34 which are attachable to exterior surfaces 16a and 18a respectively of side walls 16 and 18. Securement devices 34 are multi-component elements including a bracket 36, a threaded screw 38, a wall brace 40 and an internally threaded nut 42.

Figure 7:
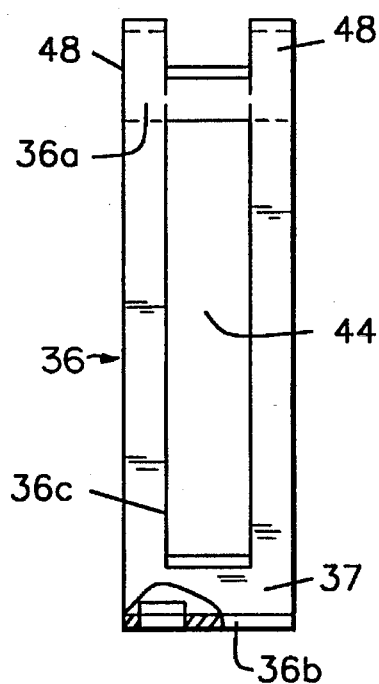
FIGS. 7 and 8 are front and side elevational showings respectively of the bracket of the mounting assembly of the present invention.
Figure 8:
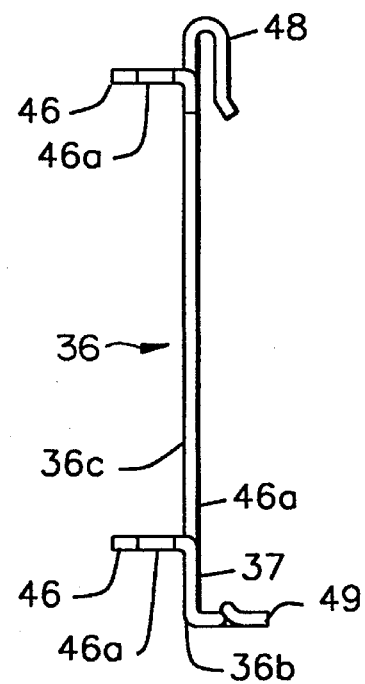

Bracket 36, shown in further detail in FIGS. 7 and 8, includes an elongate generally planar metallic body 37 having opposed ends 36a and 36b. Bracket 36 includes an elongate generally rectangular slot 44 extending through a central portion 36c of body 37 between ends 36a and 36b. Bracket 36 further includes a pair of upstanding lips 46 which are struck from body 37 on either side of slot 44. Lips 46 include holes 46a and 46b therethrough for the retention of threaded screw 38 as will be described further hereinbelow. End 36a of bracket 36 includes a pair of reversely bent fingers 48 which are adapted to wrap around a forward edge 16b, 18b of side walls 16 and 18 adjacent front face 22 (FIG. 2). Opposed end 36b of bracket 36 includes a L-shaped leg 49 adapted to engage a rearward edge 18c, 16c of side walls 16 and 18 adjacent back wall 20 of box 10 (FIG. 1). Fingers 48 and legs 49 are used in conjunction to secure brackets 36 to the exterior surfaces 16a, 18a of side walls 16 and 18. Each leg 49 includes a lance 49a extending therefrom which functions to engage each rearward edge 16c, 18c in a snap-fit manner. When properly secured, bracket 36 extends between open front face 22 and back wall 20 of box 10 (FIGS. 1 and 2).

As particularly shown in FIGS. 1–4, screw 38 is an elongate self-threading screw having a head 38a at one end and an elongate externally threaded shaft 38b extending therefrom. Screw 38 includes an undercut 38c beneath head 38a. Screw 38 is inserted through the upper hole 46a of lip 46 (FIGS. 3 and 4) and is passed through lower hole 46b. Upper hole 46 is sized so that it is threaded by the insertion of self-threading screw 38 therethrough. The undercut 38c beneath head 38a is positioned within hole 46a so that the screw 38 may continue to be rotated without binding. Lips 46 support screw 38 in position slightly raised from body 37 of bracket 36.

Figure 5:
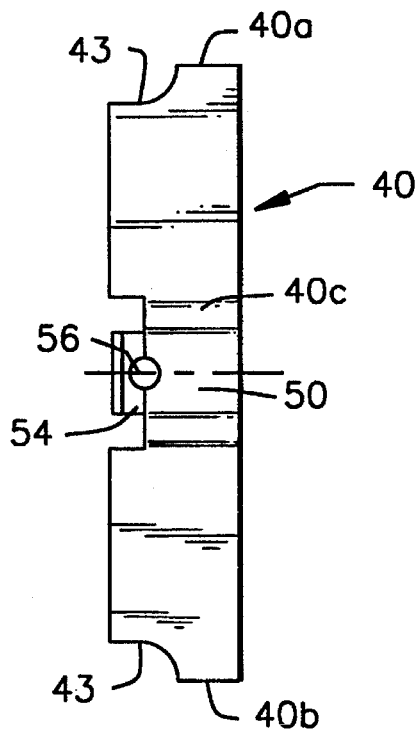
FIGS. 5 and 6 are front and side elevational showings respectively of the brace of the mounting assembly of the present invention.
Figure 6:
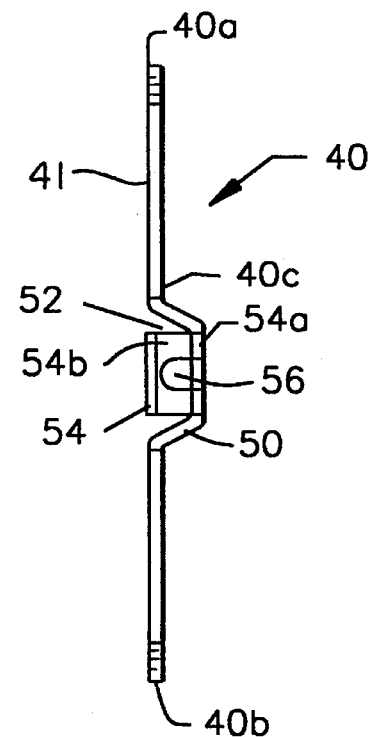

Securement device 34 further includes wall brace 40 shown in further detail in FIGS. 5 and 6. Brace 40 is an elongate metallic generally planar member having opposed ends 40a and 40b and a central extent 40c. The central extent 40c includes a hump-like ridge 50 raised from the main plane of brace 40 and which defines a recess 52 therein. Brace 40 further includes an outwardly latterly extending tab 54 extending from ridge 50. Tab 54 includes a first edge extent 54a lying in the plane of ridge 50 and a-second distal extent 54b which is bent inwardly at an angle towards the main plane of brace 40. Tab 54 further includes an enlarged aperture 56 extending through tab 54 at the location where second extent 54b bends inwardly from first edge extent 54a. Aperture 56 permits the passage of threaded shaft 38b of screw 38 therethrough.

Nut 42 is a conventional internally threaded square nut which is threadably accommodated by screw 38. Nut 42 has a width which is generally coextensive to the width of slot 44 of bracket 36 for residence therein.

Having described the components of securement device 34, the assembly of securement device 34 and its attachment to box 10 may now be described.

Figure 3:
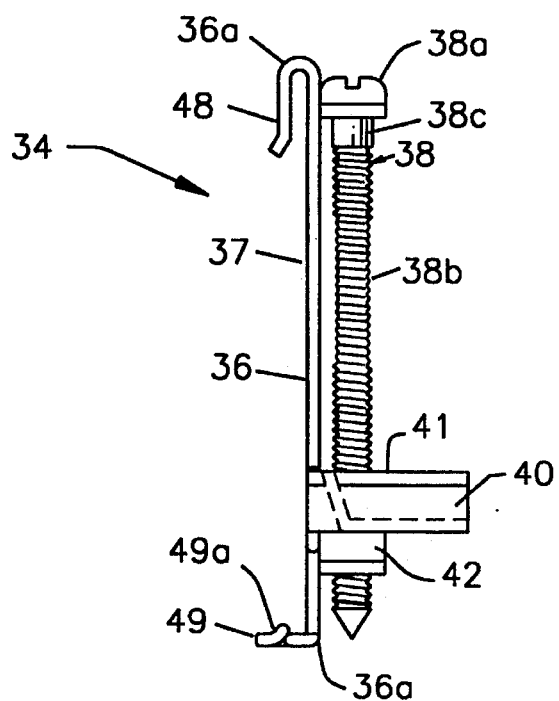
FIGS. 3 and 4 are elevational showings of the mounting assembly of the present invention in two positions.
Figure 4:
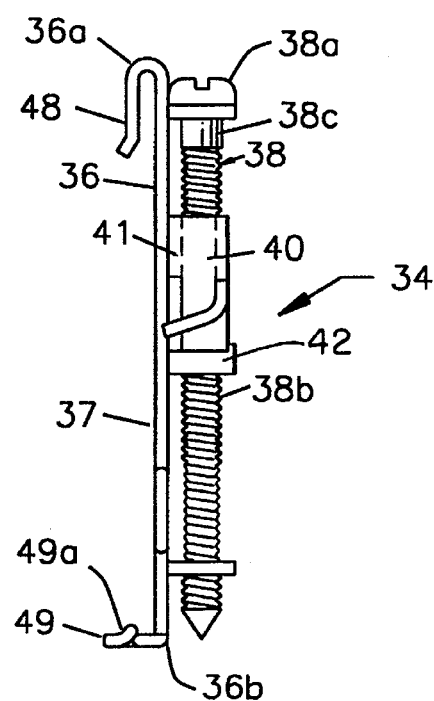

Securement device 34 is assembled as shown in FIGS. 3 and 4. Screw 38 is retained on bracket 36 by passage through the apertures 46a of lips 46. The shaft 38a of screw 38 spans the body 37 of bracket 36 and extends the length of slot 44. Brace 40 and nut 42 are retained by screw 38 between each of the spaced apart lips 46. Rectangular nut 42 is supported within slot 44 and is movable along shaft 38b upon rotation of screw 38. Nut 42 is prevented from rotating about the shaft 38b by its residence in elongate slot 44 (FIG. 7). Brace 40 is likewise retained by screw 38 by passage of the shaft 38b through enlarged aperture 56 (FIG. 6). Tab 54 extends into elongate slot 44 of bracket 36 with edge extent 54a also being resident within slot 44. Such construction helps maintain elongate brace in a position generally perpendicular to bracket 36 as the brace is prevented from canting. Brace 40 is supported between the head 38a of screw 38 and nut 42 which is rearward thereof. As aperture 56 through tab 54 is an enlarged aperture, the brace 40 is loosely retained thereon. As will be described in further detail hereinbelow, such loose retaining of the brace 40 allows the brace to pivotally move about screw 38 toward and away from bracket 36 between an open and closed position shown respectively in FIGS. 3 and 4.

Securement device 34 may be attached to each side wall 16 and 18 along the exterior surfaces 16a, 18a thereof. End 36a of each bracket 36 is placed adjacent front face 22 and fingers 48 are wrapped around forward edges 16b, 18b of the side walls 16 and 18. The opposed end 36b of bracket 36 is positioned over the rearward edges 16c, 18c of the side walls 16 and 18 which may extend slightly beyond the back wall 20. As shown in the Figures, securement devices 34 are thereby captively retained on the exterior surfaces 16a and 18a of side walls 16 and 18. In this position, brackets 36 extend between open front face 22 and back wall 20 with braces 40 extending substantially perpendicular thereto. Screws 38 being captively retained by lips 46, are spaced slightly from the exterior surfaces of the side walls.

Having described the components of the assembly of the present invention, its use in securing box 10 to wall 30 may now be described.

As shown in the drawings, an appropriately sized opening 32 is cut into wall 30 at the location where it is desired to mount box 10. As will be described in further detail hereinbelow, the size of the opening 32 which is cut into wall 30 need only be slightly wider than the dimensions of the box 10 in order to insertably accommodate it therein. Prior to inserting the box 10 into opening 32, the braces 40 of securement devices 34 are closed (FIG. 1). The closed position is defined by pivotally moving each brace 40 about screw 38 so that a first surface 41 (FIG. 6) of brace 40 is placed against each of the exterior surfaces 16a, 18a of side walls 16 and 18. The enlarged tab aperture 56 allows such pivotal movement. First surface 41 may be placed directly against the exterior surfaces 16a, 18a of the side walls as the recess 52 formed by raised ridge 50 accommodates therein the shaft 38b of screw 38 in such closed position. In this manner, with the braces 40 in their closed position, the box provides a minimal transverse profile so that the box 10 may be inserted into an opening 32 having a transverse extent just slightly greater than that of the box 10.

Upon insertion of the box 10 into the opening 32 of wall 30, flanges 26, 28 engage the outer surface 30a of wall 30 preventing further inward movement of the box. At this point the braces 40 have passed through the opening and are positioned behind the wall 30. Screws 38 may now be tightened, the heads 38a thereof being accessible adjacent the open front face 22 of box 10. Continued screw actuation of screw 38 draws nut 42 from a rearward location adjacent back wall 20 of box 10 towards a forward location adjacent front face 22. Such movement of nut 42 causes engagement thereof with brace 40. Upon such engagement brace 40 has a tendency to pivot about screw 38 to an open position (FIG. 3) where the brace first surface 41 is substantially perpendicular to the respective box side walls (FIG. 2). This is achieved in part as the tab aperture 56 about which each brace 40 pivots, is located transversely off set from the transverse center of the brace so that the brace is weighted towards the outside of the box. The progressively moving nut 42 engages the tab 56 forcing and maintaining the brace open.

Figure 9:
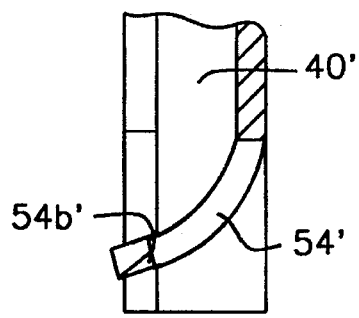
FIG. 9 is an enlarged cross-sectional showing of a preferred embodiment of a portion of the brace of FIGS. 6 and 7.

Such movement may be further enhanced by forming the tab in a manner shown in FIG. 9. The tab 54' includes a first edge extent 54a' and a distal extent 54b' which is curved inwardly towards the main plane of brace 40'. The curved construction of distal extent 54b' increases the tendency for the brace 40' to pivot or rotate about the screw 38.

Continued actuation of screw 38 causes the nut 42 to draw the brace 40 towards the open front face 22 of box 20. The longitudinal ends 40a and 40b of brace 40 may include cut-out corners 43 (FIG. 5) which allow the open brace to clear securement hardware 59 (FIG. 2) which attaches the top and bottom walls 12 and 14 to the side walls 16 and 18 of box 10. The braces 40 are continually drawn up towards wall 30 until the first surface 41 of brace 40 engages a rear surface 30b of wall 30 (FIG. 2). Continued screw tightening effectively clamps the wall 30 between both braces 40 adjacent the inner surface 30b of wall 30 and the flanges 26 and 28 adjacent the outer surface 30a of wall 30. Thus, the box 10 may be secured to wall 30 without need for mounting to a wall stud or driving fasteners into the wall 30 itself.

Various changes to the foregoing described and shown structures would now be evident to those skilled in the art. Accordingly, the particularly disclosed scope of the invention is set forth in the following claims.

What is claimed:

1. A mounting assembly attachable to a pre-manufactured electrical box having opposed side walls, top and bottom walls, and a pair of mounting flanges disposed adjacent to a front face of said box and extending outwardly from said top and bottom wall, said mounting assembly comprising:

a pair of securement members, each securement member being mountable onto one of said opposed side walls in a snap-fit manner, each of said securement members further including;

a bracket;

a brace supported by said bracket; and actuatable brace securement means for movably securing said brace to said bracket, said brace securing means being actuatable to cause progressive movement of said brace toward said front face of said box to a position of engagement with a wall surface;

whereby said wall surface is clamped between said braces of each of said securement members and said mounting flanges of said box.

2. In an electrical box having an open front face, opposed side walls, and mounting flanges extending outwardly from said box, a mounting apparatus for securing said box between an inside and outside surface of a wall about an opening into which said box is inserted, said mounting apparatus comprising:

an elongate actuatable screw captively retained externally on each side wall;

a plate-like brace supported by each screw, each said brace being movable under the actuation of each screw to place a first surface thereof into engagement with said inside surface of said wall for clamping said wall between said braces and said mounting flanges;

said brace being pivotally movable about said screw such that upon rotation of said screw said brace is moved from a closed position wherein said first surface is parallel to said side wall to an open position wherein said first surface is perpendicular to said side wall; and said brace further including a recess for accommodating said screw in said closed position to maintain said first surface in substantial contact with said side wall.

3. The mounting apparatus of claim 2 wherein each said brace is an elongate member extending transversely to said elongate screw.

4. A mounting assembly attachable to a pre-manufactured electrical box defined by opposed side walls, top and bottom walls, a rear wall and an opposed open face, said box further including a pair of mounting flanges extending outwardly from said top and bottom wall for engagement with one surface of a mounting wall about a wall opening into which said box is positionable, said mounting assembly comprising:

a pair of clip-on securement members, each securement member being mountable onto one of said opposed side walls, each said clip-on securement member further including:

an elongate bracket positioned on an external surface of said side wall;

said bracket including means to for attachably clamping said bracket to said side wall in a snap-fit manner;

a brace supported by said bracket, said brace having a mounting wall engagement surface for engagement with a surface of said mounting wall opposite said one surface;

actuatable brace securement means for movably securing said brace to said bracket, said brace securing means being actuatable to cause progressive movement of said brace from a first position spaced from said front face of said box to a second position adjacent said front face of said box to place said mounting wall engagement surface of said brace in engagement with said opposite surface of said mounting wall;

whereby said mounting wall is clamped between said braces of each of said securement members and said mounting flanges of said box.

5. A mounting assembly of claim 4 wherein said actuatable brace securement means includes:

an elongate screw captively attached to said bracket, said screw having a head positioned adjacent said open face of said box and a threaded shaft extending along said bracket; and wherein said brace includes an aperture through which said threaded shaft of said screw extends to movably retain said brace on said bracket;

wherein screw actuation of said screw causes said progressive movement of said brace.

6. A mounting assembly of claim 5 wherein said bracket extends longitudinally between said back wall and said open face of said box and wherein said brace is generally an elongate planar member extending transverse to said bracket with said brace having opposed ends and elongate side edges and wherein said aperture is centrally located with respect to said ends.

7. A mounting assembly of claim 6 wherein said brace aperture is located adjacent one longitudinal side edge of said brace.

8. In an electrical box having an open front face, opposed side walls, and mounting flanges extending outwardly from said box, a mounting apparatus for securing said box between an inside and an outside surface of a wall about an opening into which said box is inserted, said mounting apparatus comprising:

an elongate actuatable screw captively retained externally on each side wall;

a plate-like elongate brace supported by each screw and extending transversely to said elongate screw, each said brace being movable under the actuation of each screw to place a first surface thereof into engagement with said inside surface of said wall for clamping said wall between said braces and said mounting flanges;

said brace being pivotally movably about said screw to move upon rotation of said screw said brace from a closed position wherein said first surface is parallel to said side wall to an open position wherein said first surface is perpendicular to said side wall upon rotation of said screw; and each said brace further including a centrally located hump-like ridge, said ridge defining a recess for accommodating said screw in said closed position to maintain said first surface in substantial contact with said side wall.

9. The mounting apparatus of claim 8 wherein each said brace includes an aperture through said ridge for passage of said screw therethrough.

10. The mounting apparatus of claim 9 wherein each said brace has a transverse extent between opposite longitudinal edges and wherein said aperture is located adjacent one of said longitudinal edges.

11. A mounting assembly attachable to a premanufactured electrical box defined by opposed side walls, top and bottom walls, a rear wall and an opposed open face, said box further including a pair of mounting flanges extending outwardly from said top and bottom wall for engagement with one surface of a mounting wall about a wall opening into which said box is positionable, said mounting assembly comprising:

a pair of clip-on securement members, each securement member being mountable onto one of said opposed side walls, each said clip-on securement member further including:

an elongate bracket positioned on an external surface of said side wall, said bracket extending longitudinally between said back wall and said open face of said box;

said bracket including means for attachably clamping said bracket to said side wall;

a generally elongate planar brace supported by and extending transverse to said bracket, said brace having a mounting wall engagement surface for engagement with a surface of said mounting wall opposite said one surface, and said brace having opposed ends and elongate side edges;

an elongate screw captively attached to said bracket, said screw having a head positioned adjacent said open face of said box and a threaded shaft extending along said bracket wherein said brace includes an aperture through which said threaded shaft of said screw extends to movably retain said brace on said bracket, and wherein said aperture is centrally located with respect to said brace ends and is located adjacent one longitudinal side edge of said brace and said brace aperture having a transverse dimension which is substantially wider than said threaded shaft of said screw and wherein;

screw actuation of said screw causes progressive movement of said brace from a first position wherein said mounting wall engagement surface is positioned against said external surface of said side wall and spaced from said front face of said box to a second position rotated approximately 90° from said first position wherein said mounting wall engagement surface is perpendicular to said side wall, to a third position adjacent said front face of said box to place said mounting wall engagement surface of said brace in engagement with said opposite surface of said mounting wall;

whereby said mounting wall is clamped between said braces of each of said securement members and said mounting flanges of said box.

12. A mounting assembly of claim 11 wherein said brace includes a central hump-like raised location for accommodating said screw shaft in said brace first position.

13. A mounting assembly of claim 12 wherein said actuatable brace securement means further includes:

an internally-threaded nut supported on said shaft of said screw, said nut being capable of movement along said shaft upon said screw actuation, said nut being positioned rearward of said brace, said movement of said nut along said shaft causing movement of said brace from said first position to said third position.

14. A mounting assembly of claim 13 including means for rotationally confining said nut preventing rotation thereat upon said screw actuation.

15. A mount assembly of claim 14 wherein said rotationally confining means includes:

said bracket having a longitudinal slot therein, said slot being configured to retain and rotationally confine said nut therein, said slot extending along said bracket to permit longitudinal movement of said nut therealong.

16. A mounting assembly of claim 15 wherein said brace includes a tab extending from adjacent said aperture into said bracket slot for maintaining said brace in a position perpendicular to said bracket.

17. A mounting assembly of claim 16 wherein said brace tab is angled toward said screw head.

18. A mounting assembly attachable to a pre-manufactured electrical box defined by opposed side walls, top and bottom walls, a rear wall and an opposed open face, said box further including a pair of mounting flanges extending outwardly from said top and bottom wall for engagement with one surface of a mounting wall about a wall opening into which said box is positionable, said mounting assembly comprising:

a pair of clip-on securement members, each securement member being mountable onto one of said opposed side walls, each said clip-on securement member further including:

an elongate bracket positioned on an external surface of said side wall;

said bracket having a rear wall engaging element at one end thereof and a side wall engaging element at the other end thereof;

a brace supported by said bracket, said brace having a mounting wall engagement surface for engagement with a surface of said mounting wall opposite said one surface; and actuatable brace securement means for movably securing said brace to said bracket, said brace securing means being actuatable to cause progressive movement of said brace from a first position spaced from said front face of said box to a second position adjacent said front face of said box to place said mounting wall engagement surface of said brace in engagement with said opposite surface of said mounting wall;

whereby said mounting wall is clamped between said braces of each of said securement members and said mounting flanges of said box.

19. A mounting assembly of claim 18 wherein said side wall engaging element includes a reversely bent end portion adapted to wrap around an edge of said side wall adjacent said open face.

20. A mounting assembly of claim 18 wherein said rear wall engaging element includes a lance for securement adjacent to said rear wall of said box.

* * * * *